Patented Nov. 11, 1952

2,617,814

UNITED STATES PATENT OFFICE 2,617,814

METHODS OF EXTRACTING FATTY MATTERS FROM CORK

André Guillemonat, Alger, Algeria, assignor to Society "Suber," S. A., Paris, Seine, France, a society of France No Drawing. Application September 20, 1950, Serial No. 185,910. In France September 29, 1949

4 Claims. (Cl. 260—410.9)

Cork in the raw state contains etholids, i. e. combinations of high molecular weight resulting from mutual esterification of hyroxyl alcohol acids only some of which are known, to wit: phellonic acid (a mono acid, mono alcohol, the formula of which is believed to contain 22 carbon atoms); phellogenic acid (a di acid, the formula of which contains 21 carbon atoms); phloionic acid (a di acid, di alcohol, the formula of which contains 18 carbon atoms); phloionolic acid (a mono acid, tri alcohol, the formula of which contains 18 carbon atoms).

Industrial extraction of these matters from cork is very interesting for practical purposes, in particular for the manufacture of waxes and varnishes, because cork waste is very abundant in some parts of the world.

But this extraction, which may make it possible to recover an amount of acids as high as 30 per cent of the weight of cork, cannot be performed directly, because the acid-alcohols above referred to have mutually esterified one another to form polyesters which are insoluble in the usual solvents.

The object of the present invention is to provide a simple and efficient method of extraction of these matters from cork.

The principle of this method consists in transforming the polyesters existing naturally in cork into esters of alcohols which contain less than five atoms of carbon, these last mentioned esters being much more soluble than the corresponding acids, which makes it to extract them by means of usual solvents. This transformation is effected in the presence of an alkaline catalyst, which may be soda or potash.

My method is carried out as follows: Cork, previously crushed, is mixed with an amount, sufficient for soaking it, of at least one alcohol containing less than five atoms of carbon per molecule (this amount being generally equal to ten to twelve times the weight of cork in treatment). In this alcohol, from 5 to 6 per cent of caustic soda or potash have previously been dissolved.

After heating for a time which depends upon the nature of the alcohol and the fineness of the cork treated, the excess of alcohol is recovered by distillation. The dry residue thus obtained is then subjected to extraction by a solvent of the group constituted by the usual solvents of fatty bodies (hydrocarbons, trichlorethylene, carbon sulfide, ethyl oxide, alcohols, and so on).

I thus obtain, with a yield which varies according to the nature of the solvent that is used, a product having the appearance of a grease and constituted by the esters of the fatty acids of cork.

If it is desired to obtain the fatty acids themselves, it suffices to saponify these esters through one of the well known methods used for the obtainment of fatty acids from animal or vegetable oils or greases. For instance, these esters may be saponified by a mineral base, such as soda, after which the resultant solution is treated by a mineral acid to disengage the organic acids from their sodium salts. The esters might also be hydrolized in an autoclave in the presence of lime or catalysts.

The following examples are given merely by way of indication and have no limitative character:

*Example I.*—To 100 gr. of cork powder capable of passing through a sixty mesh sieve, are added 1300 cubic centimeters of methanol containing in solution 6 gr. of caustic potash. The whole is boiled under a reflux condenser for three hours and the excess of alcohol is then distilled off.

The dry residue weighs about 105 gr. It is placed in a Soxhlet apparatus and an extraction with trichlorethylene is performed. I obtain: 49 gr. of a light brown product having the consistency of a grease and constituted by the methyl esters of cork; and 56 gr. of residue.

The methyl esters thus obtained are saponified by boiling them while stirring for thirty minutes with 200 cubic centimeters of water containing 8 gr. of caustic soda. 10 gr. of sulfuric acid are then added. The organic acids collect at the surface of water. Once dry, their weight is 48 gr.

*Example II.*—The treatment is the same as that of Example I but extraction in the Soxhlet apparatus is carried out with ethyl oxide. I obtain: 39 gr. of a light yellow grease; and 66 gr. of residue.

*Example III.*—150 gr. of cork powder capable of passing through a 40 mesh sieve or mixed with 1800 cubic centimeters of ethanol containing 8 gr. of caustic soda in solution. The whole is boiled under a reflux condenser for two hours and thirty minutes. The excess of alcohol is distilled off. The dry residue is extracted with trichlorethylene. I obtain: 72 gr. of a light brown grease; and 85 gr. of residue.

What I claim is:

1. The method of obtaining a fatty matter from cork which comprises heating a mixture of powdered cork and at least one alcohol containing less than five atoms of carbon per molecule in the presence of an amount of an alkaline catalyst ranging from 5 to 6 per cent by weight of the amount of cork treated, distilling off the excess of alcohol from the mass thus heated, and subjecting the dry residue obtained after this distillation to extraction by organic solvent and recovering a solution containing esters of the fatty acids of said cork.

2. The method according to claim 1 in which the alkaline catalyst is caustic soda.

3. The method according to claim 1 in which the alkaline catalyst is caustic potash.

4. The method according to claim 1, further comprising the step of hydrolyzing the matters extracted by the solvent to obtain the fatty acids of cork.

A. GUILLEMONAT.

REFERENCES CITED

The following references are of record in the file of this patent:

UNITED STATES PATENTS

| Number | Name | Date |
|---|---|---|
| 2,571,221 | Dupont | Oct. 16, 1951 |

OTHER REFERENCES

Chemical Abstracts—vol. 25 (1931), pages 3320–21, citing Zetzsche et al.